(12) United States Patent
Lee et al.

(10) Patent No.: US 9,777,836 B1
(45) Date of Patent: Oct. 3, 2017

(54) PARK LOCK FOR AN AUTOMATIC TRANSMISSION

(71) Applicant: ZF Friedrichshafen AG, Friedrichshafen (DE)

(72) Inventors: Won Lee, Greenville, SC (US); Thomas Geiss, Simpsonville, SC (US); David Drosback, Greenville, SC (US); Abhishek Raydurga, Greenville, SC (US)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 15/337,635

(22) Filed: Oct. 28, 2016

(51) Int. Cl.
F16H 48/06 (2006.01)
F16H 63/34 (2006.01)
F16H 3/66 (2006.01)

(52) U.S. Cl.
CPC ........... *F16H 63/3475* (2013.01); *F16H 3/66* (2013.01); *F16H 63/3433* (2013.01)

(58) Field of Classification Search
CPC ..... F16H 63/3475; F16H 63/3433; F16H 3/66
See application file for complete search history.

(56) References Cited

U.S. PATENT DOCUMENTS

| | | | | |
|---|---|---|---|---|
| 4,519,483 A * | 5/1985 | Schlicker | ................ | B60T 1/005 192/219.5 |
| 5,295,412 A * | 3/1994 | Donato | ................... | B60T 1/005 192/114 R |
| 5,397,282 A * | 3/1995 | Weidman | ................. | F16H 3/66 475/205 |
| 7,789,792 B2 | 9/2010 | Kamm et al. | | |
| 8,398,522 B2 | 3/2013 | Bauknecht et al. | | |
| 8,840,506 B2 * | 9/2014 | Schwekutsch | ........ | B60T 13/746 180/65.6 |
| 8,851,263 B2 | 10/2014 | Schraff | | |
| 2011/0198190 A1 | 8/2011 | Steinhauser et al. | | |
| 2012/0103752 A1 * | 5/2012 | Kim | ................... | F16H 63/3416 192/219.5 |
| 2012/0145512 A1 * | 6/2012 | Kim | ................... | F16H 63/3425 192/219.5 |
| 2014/0251750 A1 | 9/2014 | List et al. | | |
| 2014/0346004 A1 * | 11/2014 | Landino | ................. | B60T 1/005 192/219.5 |
| 2016/0061323 A1 * | 3/2016 | Larsson | ............. | F16H 63/3433 74/411.5 |

\* cited by examiner

*Primary Examiner* — David J Hlavka
(74) *Attorney, Agent, or Firm* — Dority & Manning, P.A.

(57) ABSTRACT

A park lock for an automatic transmission includes a primary actuator that is operable to move a primary rod such that the primary rod rotates a pawl and selectively meshes a tooth of the pawl with teeth of a park wheel. A secondary actuator is operable to move a secondary rod. A distal end portion of the secondary rod holds the tooth of the pawl in meshing with the teeth of the park wheel in a park configuration. The distal end portion of the secondary rod blocks the tooth of the pawl from meshing with the teeth of the park wheel in a drive configuration. A related automatic transmission is also provided.

20 Claims, 5 Drawing Sheets

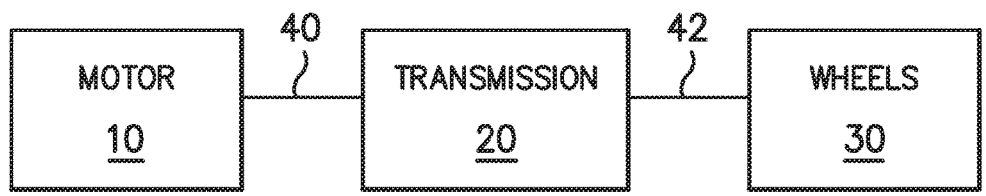
FIG. -1-

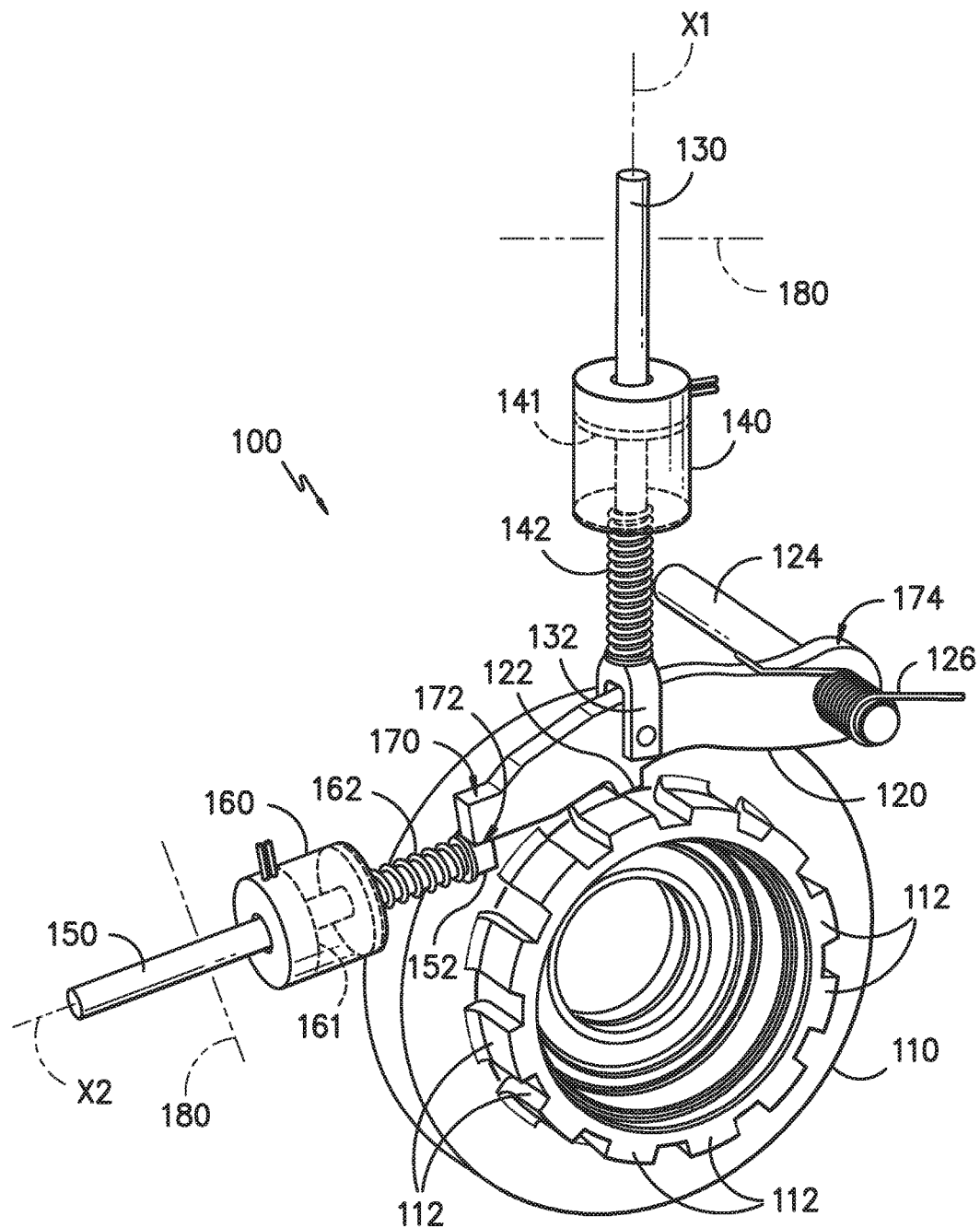
FIG. -2-

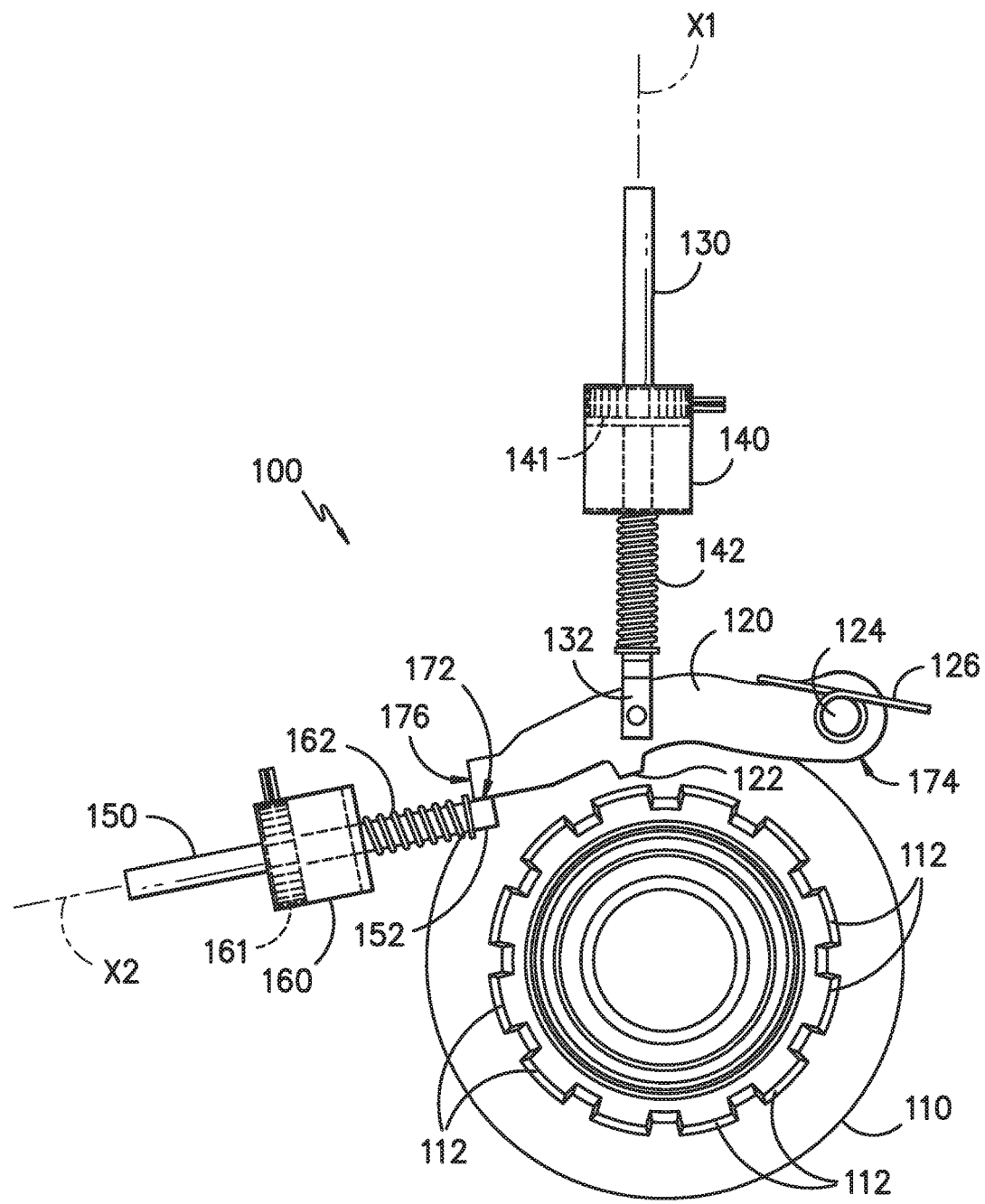
FIG. -3-

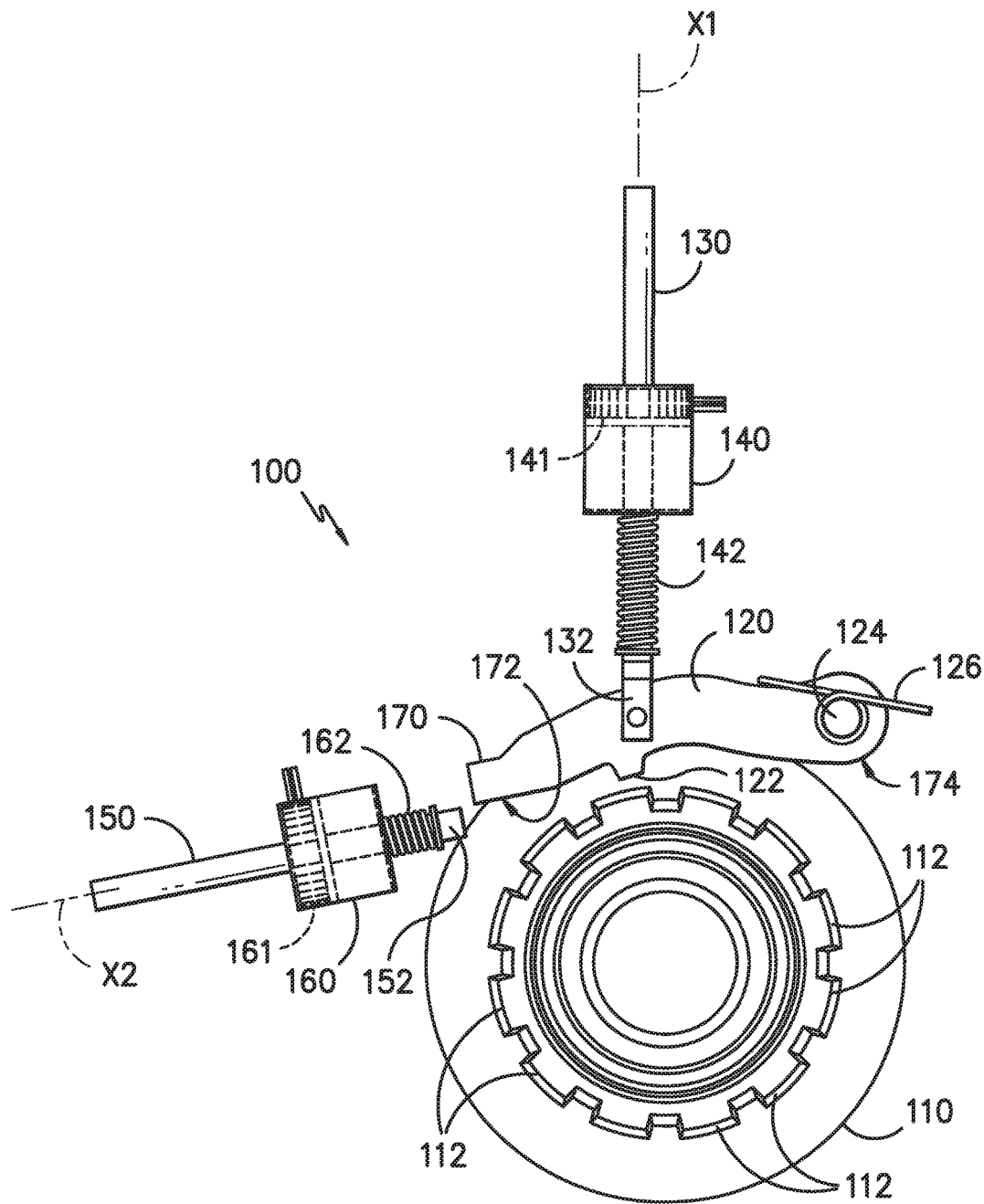
FIG. -4-

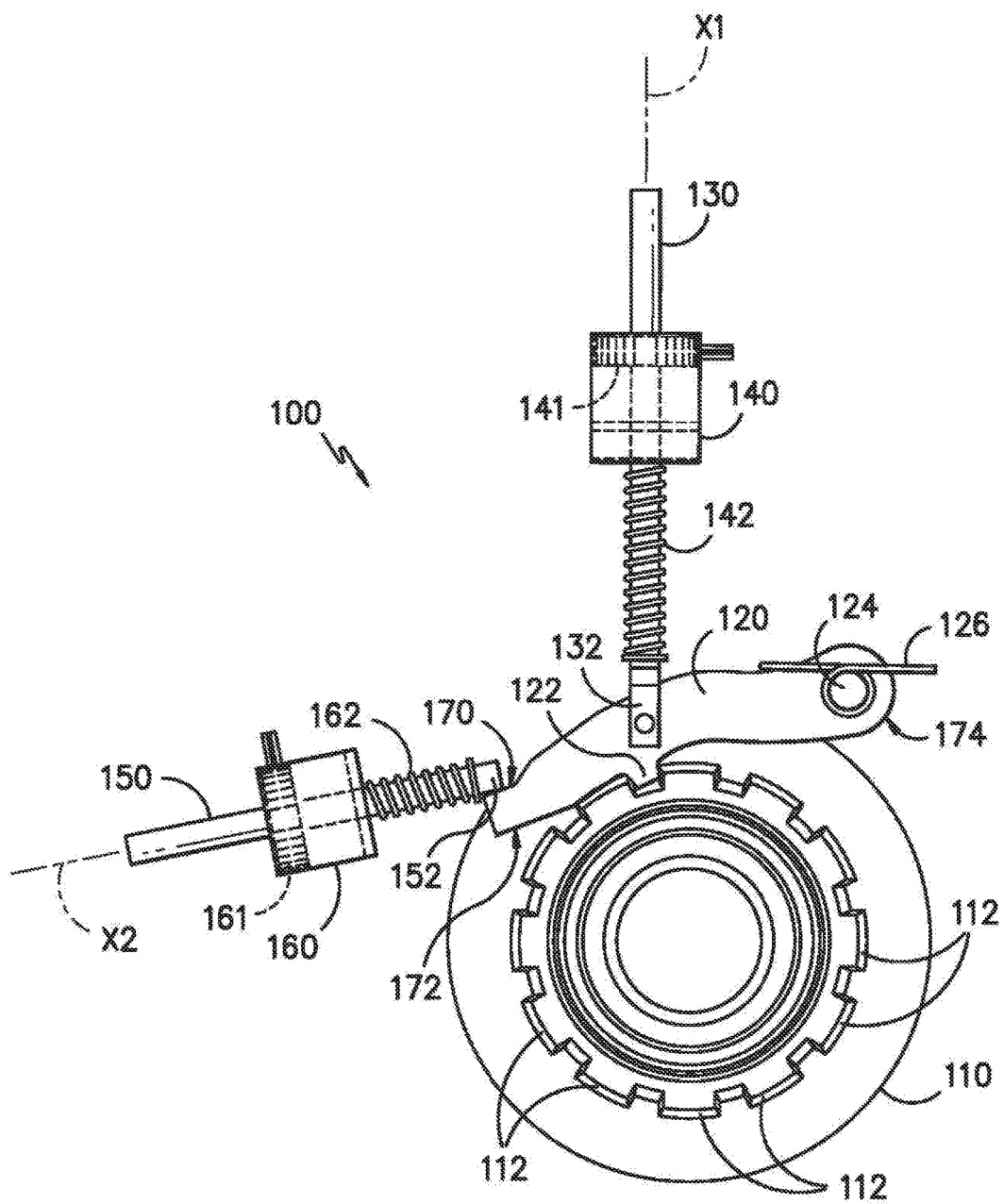
FIG. —5—

PARK LOCK FOR AN AUTOMATIC TRANSMISSION

FIELD OF THE INVENTION

The present subject matter relates generally to automatic transmissions and park locks for automatic transmissions.

BACKGROUND OF THE INVENTION

Automatic transmissions generally include at least one planetary gear set and a plurality of shift elements. The shift elements selectively engage components of the planetary gear sets in order to hinder or prevent rotation of the components. Selective actuation of the shift elements adjusts the gear ratio of the automatic transmission and shifts the automatic transmission between its various gears.

Parking locks in automatic transmission are used to block rotation of an associated output shaft when the automatic transmission is in a parked shift position. Certain transmission parking locks include a hydraulic actuator, a rotatable disk, an actuating rod and a locking lever that are coupled together to provide a shiftable parking lock. Such parking locks can have drawbacks. For example, the hydraulic actuator, rotatable disk, actuating rod and locking lever can occupy a large volume of space within an associated transmission housing. As another example, the hydraulic actuator requires a complex series of switches, controls, etc. that frequently require direct physical connection to a remote interface.

Accordingly, a compact parking lock for an automatic transmission would be useful. A simple parking lock for an automatic transmission having robust performance would also be useful.

BRIEF DESCRIPTION OF THE INVENTION

The present subject matter provides a park lock for an automatic transmission. A primary actuator is operable to move a primary rod such that the primary rod rotates a pawl and selectively meshes a tooth of the pawl with teeth of a park wheel. A secondary actuator is operable to move a secondary rod. A distal end portion of the secondary rod holds the tooth of the pawl in meshing with the teeth of the park wheel in a park configuration. The distal end portion of the secondary rod blocks the tooth of the pawl from meshing with the teeth of the park wheel in a drive configuration. A related automatic transmission is also provided. Additional aspects and advantages of the invention will be set forth in part in the following description, or may be apparent from the description, or may be learned through practice of the invention.

In a first exemplary embodiment, an automatic transmission is provided. The automatic transmission includes an input shaft and an output shaft. A plurality of planetary gear sets is provided between the input and output shaft. The planetary gear sets of the plurality of planetary gear sets provide multiple transmission ratios between the input shaft and the output shaft. A park lock is selectively adjustable between a park configuration and a drive configuration. The park lock includes a park wheel defining a plurality of teeth. A pawl defines a tooth. The tooth of the pawl meshes with the teeth of the plurality of teeth of the park wheel to block rotation of the output shaft when the park lock is in the park configuration. The tooth of the pawl does not mesh with the teeth of the plurality of teeth of the park wheel when the park lock is in the drive configuration. A primary rod is coupled to the pawl. A primary actuator is positioned at the primary rod. The primary actuator is operable to move the primary rod along a first axis such that the primary rod rotates the pawl and selectively meshes the tooth of the pawl with the teeth of the plurality of teeth of the park wheel. A secondary rod is positioned proximate the pawl. A secondary actuator is positioned at the secondary rod. The secondary actuator is operable to move the secondary rod along a second axis that is not parallel to the first axis. A distal end portion of the secondary rod is positioned adjacent a first portion of the pawl when the park lock is in the park configuration to hold the tooth of the pawl in meshing with the teeth of the plurality of teeth of the park wheel. The distal end portion of the secondary rod is positioned adjacent a second portion of the pawl when the park lock is in the drive configuration to block the tooth of the pawl from meshing with the teeth of the plurality of teeth of the park wheel.

In a second exemplary embodiment, a park lock for an automatic transmission is provided. The park lock is selectively adjustable between a park configuration and a drive configuration. The park lock includes a park wheel that defines a plurality of teeth. A pawl defines a tooth. The tooth of the pawl meshes with the teeth of the plurality of teeth of the park wheel when the park lock is in the park configuration. The tooth of the pawl does not mesh with the teeth of the plurality of teeth of the park wheel when the park lock is in the drive configuration. A primary rod is coupled to the pawl. A primary actuator is positioned at the primary rod. The primary actuator is operable to move the primary rod along a first axis such that the primary rod rotates the pawl and selectively meshes the tooth of the pawl with the teeth of the plurality of teeth of the park wheel. A secondary rod is positioned proximate the pawl. A secondary actuator is positioned at the secondary rod. The secondary actuator is operable to move the secondary rod along a second axis that is not parallel to the first axis. A distal end portion of the secondary rod is positioned adjacent a first portion of the pawl when the park lock is in the park configuration to hold the tooth of the pawl in mesh with the teeth of the plurality of teeth of the park wheel. The distal end portion of the secondary rod is positioned adjacent a second portion of the pawl when the park lock is in the drive configuration to block the tooth of the pawl from meshing with the teeth of the plurality of teeth of the park wheel.

In a third exemplary embodiment, a park lock for an automatic transmission is provided. The park lock is selectively adjustable between a park configuration and a drive configuration. The park lock includes a park wheel that defines a plurality of teeth. A pawl defines a tooth. The tooth of the pawl meshes with the teeth of the plurality of teeth of the park wheel when the park lock is in the drive configuration. The tooth of the pawl does not mesh with the teeth of the plurality of teeth of the park wheel when the park lock is in the drive configuration. A primary rod is coupled to the pawl. The park lock also includes means for moving the primary rod such that the primary rod rotates the pawl and selectively meshes the tooth of the pawl with the teeth of the plurality of teeth of the park wheel. A secondary rod is positioned proximate the pawl. The park lock further includes means for moving the secondary rod such that: (1) the secondary rod holds the tooth of the pawl in meshing with the teeth of the plurality of teeth of the park wheel when the park lock is in the park configuration; and (2) the secondary rod blocks the tooth of the pawl from meshing with the teeth of the plurality of teeth of the park wheel when the park lock is in the drive configuration.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a schematic view of certain components of a drive drain according to an exemplary embodiment of the present subject matter.

FIG. 2 provides a perspective view of a park lock according to an exemplary embodiment of the present subject matter.

FIG. 3 provides an elevation view of the exemplary park lock of FIG. 2 in a drive configuration.

FIG. 4 provides an elevation view of the exemplary park lock of FIG. 2 in a transition configuration.

FIG. 5 provides an elevation view of the exemplary park lock of FIG. 2 in a park configuration.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a schematic view of certain components of a drive drain for a motor vehicle according to an exemplary embodiment of the present subject matter. The drive train shown in FIG. 1 is provided by way of example only. Thus, the present subject matter may be used in or with any other suitable drive train in alternative exemplary embodiments. As shown in FIG. 1, the drive train has a motor 10, such as an internal combustion engine and/or an electric motor. The drive train also includes an automatic transmission 20, wheels 30, an input shaft 40 and an output shaft 42. Input shaft 40 couples motor 10 and transmission 20 such that rotation of motor 10 is transferable to automatic transmission 20 via input shaft 40. Input shaft 40 may include a torque converter (not shown), e.g., when motor 10 is an internal combustion engine.

Automatic transmission 20 is disposed between input shaft 40 and output shaft 42 and is operable to adjust or change a transmission ratio between input shaft 40 and output shaft 42. Automatic transmission 20 may be any suitable type of automatic transmission. For example, automatic transmission 20 may be a hydraulic automatic transmission with planetary gear sets, such as a nine-speed automatic transmission as described in U.S. Pat. No. 8,398, 522 to Bauknecht et al. or an eight-speed automatic transmission as described in U.S. Pat. No. 7,789,792 to Kamm et al., both of which are incorporated by reference in there entireties. Thus, automatic transmission 20 may be operable to provide multiple forward gear ratios, e.g., between input shaft 40 and output shaft 42, using the planetary gears within automatic transmission 20. As further examples, automatic transmission 20 may be a continuously variable transmission (CVT) or a dual clutch transmission (DCT). Thus, automatic transmission 20 may be operable to provide various forward gear ratios, e.g., between input shaft 40 and output shaft 42. As may be seen from the above, the term "automatic transmission" is used broadly herein, and the present subject matter may be used in or with any suitable automatic transmission. Still referring to FIG. 1, output shaft 42 is connected to wheels 30, e.g., via a suitable differential (not shown). Thus, automatic transmission 20 may transfer rotation from motor 10 to wheels 30 at a suitable speed to drive a vehicle associated with the drive strain of FIG. 1.

FIG. 2 provides a perspective view of a park lock 100 according to an exemplary embodiment of the present subject matter. Park lock 100 may be utilized in a drive train, such as the drive train of FIG. 1, to block or limit rotation of an output shaft when an associated vehicle is in park, e.g., rather than drive. Thus, as discussed in greater detail below, park lock 100 may be coupled to or engage output shaft 42 such that park lock 100 prevents or hinders rotation of output shaft 42 when a user shifts the vehicle to park. It should be understood that while described in greater detail below in the context of the drive train of FIG. 1, park lock 100 may be used in or with any other suitable automatic transmission in alternative exemplary embodiments.

As may be seen in FIG. 2, park lock 100 includes a park wheel 110 that is mounted, connected, coupled or formed with output shaft 42. For example, in the exemplary embodiment shown in FIG. 2, park wheel 110 and output shaft 42 are separate components. In particular, park wheel 110 may be a separate piece of forged metal that is mounted to drive shaft 42, e.g., with fasteners, shrink fit, etc. As another example, park wheel 110 may be integrally formed with output shaft 42, e.g., such that park wheel 110 and output shaft 42 are formed from a single, seamless piece of material, such as metal. In particular, output shaft 42 may be machined to form park wheel 110 thereon. Park wheel 110 defines a plurality of teeth 112. Teeth 112 may be circumferentially spaced on park wheel 110. In particular, teeth 112 may be uniformly spaced apart from one another on park wheel 110.

Park lock 100 also includes a pawl 120. Pawl 120 defines a tooth 122, and pawl 120 is rotatable relative to park wheel 110. Thus, tooth 122 of pawl 120 may selectively mesh with teeth 112 of park wheel 110, as discussed in greater detail below. Pawl 120 extends between a proximal end portion 174 and a distal end portion 176. Tooth 122 may be positioned between proximal end portion 174 and distal end portion 176 of pawl 120. Pawl 120 may rotate on a support shaft 124, e.g., that is rotatably connected to or supported by a transmission housing 180 in which park lock 100 is disposed. Pawl 120 may be mounted to support shaft 124 at proximal end portion 174 of pawl 120. A retention spring 126 is coupled to pawl 120 at proximal end portion 174 of pawl 120. Retention spring 126 may be configured to bias or urge pawl 120 towards lock wheel 110.

A primary shaft or rod 130 is coupled to pawl 120, e.g., between the proximal end portion 174 and distal end portion 176 of pawl 120. In particular, a yoke 132 of primary rod 130 may be rotatably coupled to pawl 120 such that pawl 120 is received within yoke 132 of primary rod 130. A primary actuator 140 is positioned at primary rod 130.

Primary actuator 140 is operable to move primary rod 130 along a first axis X1, e.g., such that primary rod 130 rotates pawl 120 and selectively meshes tooth 122 of pawl 120 with teeth 112 of park wheel 110. For example, primary actuator 140 may linearly translate (e.g., extend and retract) primary rod 130 along the first axis X1.

A secondary shaft or rod 150 is also positioned proximate pawl 120. In particular, a distal end portion 152 of secondary rod 150 may be positioned at or adjacent distal end portion 176 of pawl 120, and distal end portion 152 of secondary rod 150 may selectively engage distal end portion 176 of pawl 120 in order to limit motion of pawl 120. As may be seen in FIG. 2, secondary rod 150 may be positioned opposite support shaft 124 about pawl 120. A secondary actuator 160 is positioned at secondary rod 150. As discussed in greater detail below, secondary actuator 160 is operable to move secondary rod 150 such that secondary rod 150 holds tooth 122 of pawl 120 in mesh with teeth 112 of park wheel 110 when park lock 100 is in the park configuration. In addition, secondary actuator 160 is operable to move secondary rod 150 such that secondary rod 150 blocks tooth 122 of pawl 120 from meshing with teeth 112 of park wheel 110 when park lock 100 is in the drive configuration.

Secondary actuator 160 may be operable to move secondary rod 150 along a second axis X2. For example, secondary actuator 160 may linearly translate (e.g., extend and retract) secondary rod 150 along the second axis X2. The second axis X2 is not parallel to the first axis X2. For example, the second axis X2 may be angled at about ninety degrees (90°) relative to the first axis X1, in certain exemplary embodiments. As used herein, the term "about" means within ten degrees of the stated angle when used in the context of angles. In alternative exemplary embodiments, the second axis X2 may be angled by between twenty degrees (20°) and seventy degrees (70°) relative to the first axis X1. Thus, primary actuator 140 and secondary actuator 160 may be positioned and oriented to extend and retract primary rod 130 and secondary rod 150, respectively, at different angles during operation of park lock 100.

Primary actuator 140 and secondary actuator 160 may be any suitable actuators. For example, primary actuator 140 and secondary actuator 160 may each be electric solenoids. Thus, primary actuator 140 may include a magnet 141 fixed to primary rod 130, and secondary actuator 160 may include a magnet 161 fixed to secondary rod 150. Coils within primary actuator 140 and secondary actuator 160 may receive an electric current that induces a magnetic field that engages magnet 141 on primary rod 130 and magnet 161 on secondary rod 150, respectively, to extend and retract primary rod 130 and secondary rod 150. When primary actuator 140 and secondary actuator 160 are electric solenoids, park lock 100 may provide a robust, compact parking lock for an associated automatic transmission. In addition, the electric solenoids may permit park lock 100 to be less complex and/or less expensive relative to known park locks. Park lock 100 with electric solenoids may also be more compact relative to known park locks because there is no need for a direct physical connection from a control unit to actuate park lock 100, such as a pressurized hydraulic fluid passage. In alternative exemplary embodiments, primary actuator 140 and secondary actuator 160 may be pneumatic actuators, hydraulic actuators, electro-mechanical linear actuators, etc.

Park lock 100 also includes a primary spring 142 and a secondary spring 162. Primary spring 142 is positioned on primary rod 140. For example, primary spring 142 may be a helical coil spring, and primary rod 140 may extend through primary spring 142. Primary spring 142 may also be compressed between primary actuator 140 and a distal end portion (e.g., yoke 132) of primary rod 130. Secondary spring 162 is positioned on secondary rod 160. For example, secondary spring 162 may be a helical coil spring, and secondary rod 160 may extend through secondary spring 162. Secondary spring 162 may be compressed between secondary actuator 160 and distal end portion 152 of secondary rod 150. Primary spring 142 and secondary spring 162 may each urge a respective one of primary rod 140 and secondary rod 160 to an extended position.

FIGS. 3 through 5 provide elevation views of park lock 100 in various configurations. In particular, FIG. 3 provides an elevation view of park lock 100 in a drive configuration; FIG. 4 provides an elevation view of park lock 100 in a transition configuration between the drive configuration and a park configuration; and FIG. 5 provides an elevation view of park lock 100 in the park configuration. Primary and secondary actuators 140, 160 are operable to adjust park lock 100 between the drive configuration (FIG. 3) and the park configuration (FIG. 5), as discussed in greater detail below.

As may be seen in FIG. 5, tooth 122 of pawl 120 meshes with teeth 112 of park wheel 110, e.g., to block rotation of output shaft 42, when park lock 100 is in the park configuration. Conversely, as may be seen in FIG. 3, tooth 122 of pawl 120 does not mesh with teeth 112 of park wheel 110 when park lock 100 is in the drive configuration, e.g., such that tooth 122 of pawl 120 does not block rotation of output shaft 42 as in the park configuration. By shifting between the park configuration (FIG. 5) and the drive configuration (FIG. 3), park lock 100 assists with braking an associated vehicle.

Turning to FIG. 3, park lock 100 is shown in the drive configuration. Park lock 100 may be commanded to the drive configuration when an associated vehicle is shifted to drive ("D") or reverse ("R") in which automatic transmission 20 transfers power from motor 10 to wheels 30. As may be seen in FIG. 3, tooth 122 of pawl 120 does not mesh or engage with teeth 112 of park wheel 110 when park lock 100 is in the drive configuration. Thus, park wheel 110 may rotate without interference from pawl 120 in the drive configuration.

Primary actuator 140 cooperates with secondary rod 150 to hold pawl 120 in the drive configuration. For example, primary actuator 140 operates to retract primary rod 130 and rotate pawl 120 away from park wheel 110. Thus, primary actuator 140 may overcome the force applied to pawl 120 by retention spring 126 and/or primary spring 142 to position pawl 120 such that tooth 122 of pawl 120 does not mesh or engage with teeth 112 of park wheel 110 in the drive configuration. Primary actuator 140 may remain active when park lock 100 is in the drive configuration to hold pawl 120 away from lock wheel 110. However, e.g., when primary actuator 140 is an electric solenoid, electrical current may be required for primary actuator 140 to retract and hold primary rod 150 and electrical current to primary actuator 140 may be interrupted for a variety of reasons. Thus, secondary rod 150 may be positioned to assist with holding pawl 120 in the drive configuration. In particular, secondary rod 150 may be positioned to block or prevent pawl 120 from engaging park wheel 110 when park lock 100 is in the drive configuration. As shown in FIG. 3, distal end portion 152 of secondary rod 150 is positioned adjacent and/or contacts a second portion 172 of pawl 120 when park lock 100 is in the drive configuration in order to block tooth 122 of pawl 120 from meshing with teeth 112 of park wheel 110. For example, distal end portion 152 of secondary rod 150 may be positioned between distal end portion 176 of pawl 120 and park wheel 110 in the drive configuration to block rotation of pawl 120 towards park wheel 110.

Turning to FIG. 4, park lock 100 is shown in the intermediate configuration between the drive and park configurations. From the drive configuration shown in FIG. 3, park lock 100 may be commanded to the park configuration when the associated vehicle is shifted to park ("P") in which automatic transmission 20 does not transfer power from motor 10 to wheels 30. Primary actuator 140 retracts primary rod 130 and rotates pawl 120 away from park wheel 110 in the intermediate configuration. Similarly, secondary actuator 160 operates to retract secondary rod 150 in the intermediate configuration. Thus, secondary actuator 160 may overcome the force applied to secondary rod 150 by secondary spring 162. From the park configuration, secondary actuator 160 may be first be activated to retract secondary rod 150 and then primary actuator 140 may be activated to retract primary rod 130 and rotate pawl 120 away from park wheel 110.

Turning to FIG. 5, park lock 100 is shown in the park configuration. As may be seen in FIG. 5, tooth 122 of pawl 120 meshes or engages with teeth 112 of park wheel 110 when park lock 100 is in the park configuration. Thus, pawl 120 blocks or obstructs rotation of park wheel 110 (and an associated output shaft) when park lock 100 is in the park configuration. As discussed above, secondary actuator 160 operates to retract secondary rod 150 in the intermediate configuration. With secondary rod 150 retracted as shown in FIG. 4, primary actuator 140 is deactivated and does not operate to retract primary rod 130 in the park configuration. Thus, primary spring 142 and retention spring 126 rotate pawl 120 towards park wheel 110, e.g., from the intermediate configuration to the park configuration. Primary spring 142 cooperates with retention spring 126 to hold pawl 120 in the park configuration. From the intermediate position, secondary actuator 160 may retract secondary rod 150 until tooth 122 of pawl 120 meshes or engages with teeth 112 of park wheel 110 then secondary actuator 160 may be deactivated such that secondary spring 162 extends secondary rod 150 towards pawl 120 and secondary rod 150 blocks rotation of pawl 120 away from park wheel 110.

Secondary rod 150 may be positioned to hold assist with holding pawl 120 in the park configuration. In particular, secondary rod 150 may be positioned to hold pawl 120 in engagement with park wheel 110 when park lock 100 is in the park configuration. As shown in FIG. 5, distal end portion 152 of secondary rod 150 is positioned adjacent and/or contacts a first portion 170 of pawl 120 when park lock 100 is in the park configuration in order to hold tooth 122 of pawl 120 in mesh or engagement with teeth 112 of park wheel 110. For example, distal end portion 176 of pawl 120 may be positioned between distal end portion 152 of secondary rod 150 and park wheel 110 in the park configuration in order to block rotation of pawl 120 away from park wheel 110.

In the manner described above, park lock 100 may be shifted between the park and drive configurations with primary actuator 140 in order to selectively block rotation of output shaft 42 with pawl 120. For example, park lock 100 may be shifted from the drive configuration shown in FIG. 3 to the intermediate configuration shown in FIG. 4 and then to the park configuration shown in FIG. 5, e.g., when a vehicle is shifted from a forward or a reverse gear into park. As another example, park lock 100 may also be shifted from the park configuration shown in FIG. 5 to the intermediate configuration shown in FIG. 4 and then to the drive configuration shown in FIG. 3, e.g., when a vehicle is shifted from park into a forward or a reverse gear. Secondary rod 150 may hold pawl 120 in the park and drive configurations in order to prevent undesirable engagement of pawl 120 with park wheel 110, e.g., when primary actuator 140 losses power. Thus, secondary rod 150 may provide a safety stop or failsafe mechanism that prevents undesired shifting of the park lock 100 from the drive configuration to the park configuration and/or from the park configuration to the drive configuration.

Park lock 100 may also include features for manually shifting park lock 100 between the park and drive configurations, e.g., when an associated vehicle loses power and needs to be moved or towed. For example, primary rod 130 and secondary rod 150 may extend through a transmission housing 180 of transmission 20. Thus, an operator may grasp primary rod 130 or a handle (not shown) coupled to primary rod 130 outside of transmission housing 180 to retract primary rod 130 in the manner described above. As another example, the operator may grasp secondary rod 150 or a handle (not shown) coupled to secondary rod 150 outside of transmission housing 180 to retract secondary rod 150 in the manner described above. Accordingly, park lock 100 may be manually shifted between the park and drive configurations. In particular, primary rod 130 may be manually movable along the first axis X1 without primary actuator 140, and secondary rod 150 may be manually movable along the second axis X2 without secondary actuator 160. In alternative exemplary embodiments, a Bowden cable may be coupled to primary rod 130 and/or secondary rod 150 to allow manual shifting park lock 100 between the park and drive configurations.

Operation of park lock 100 may be regulated by a controller (not shown), such as a transmission controller. The controller may include a memory and microprocessor, such as a general or special purpose microprocessor operable to execute programming instructions or micro-control code associated with transmission controls. The memory may represent random access memory such as DRAM, or read only memory such as ROM or FLASH. In one embodiment, the processor executes programming instructions stored in memory. The memory may be a separate component from the processor or may be included onboard within the processor. Alternatively, the controller may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Primary actuator 140 and secondary actuator 160 may be in communication with the controller via one or more signal lines or shared communication busses. Thus, the controller may be in operative communication with primary actuator 140 and secondary actuator 160, e.g., in order to regulate extension and retraction of primary rod 140 and secondary rod 160 in the manner described above, e.g., by supplying electrical current to coils within primary and secondary actuators 140, 160.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An automatic transmission, comprising:
   an input shaft;
   an output shaft;
   a plurality of planetary gear sets provided between the input and output shaft, the plurality of planetary gear sets providing multiple transmission ratios between the input shaft and the output shaft; and
   a park lock selectively adjustable between a park configuration and a drive configuration, the park lock comprising
      a park wheel defining a plurality of teeth;
      a pawl defining a tooth, the tooth of the pawl meshing with one or more of the plurality of teeth of the park wheel to block rotation of the output shaft when the park lock is in the park configuration, the tooth of the pawl not meshing with the one or more of the plurality of teeth of the park wheel when the park lock is in the drive configuration;
      a primary rod coupled to the pawl;
      a primary actuator positioned at the primary rod, the primary actuator operable to move the primary rod along a first axis such that the primary rod rotates the pawl and selectively meshes the tooth of the pawl with the one or more of the plurality of teeth of the park wheel;
      a secondary rod positioned proximate the pawl;
      a secondary actuator positioned at the secondary rod, the secondary actuator operable to move the secondary rod along a second axis that is not parallel to the first axis,
      wherein a distal end portion of the secondary rod is positioned adjacent a first portion of the pawl when the park lock is in the park configuration to hold the tooth of the pawl in meshing with the one or more of the plurality of teeth of the park wheel, the distal end portion of the secondary rod positioned adjacent a second portion of the pawl when the park lock is in the drive configuration to block the tooth of the pawl from meshing with the one or more of the plurality of teeth of the park wheel.

2. The automatic transmission of claim 1, wherein the primary and secondary actuators are electric solenoids.

3. The automatic transmission of claim 2, wherein the park lock further comprises a primary spring on the primary rod, the primary spring compressed between the primary actuator and a distal end portion of the primary rod.

4. The automatic transmission of claim 3, wherein the park lock further comprises a secondary spring on the secondary rod, the secondary spring compressed between the secondary actuator and the distal end portion of the secondary rod.

5. The automatic transmission of claim 1, wherein the pawl extends between a proximal end portion of the pawl and a distal end portion of the pawl, the park lock further comprising a support shaft on which that pawl is rotatable, the distal end portion of the secondary rod selectively engaging the pawl at the distal end portion of the pawl.

6. The automatic transmission of claim 5, wherein the primary rod is coupled to the pawl between the proximal end portion of the pawl and the distal end portion of the pawl.

7. The automatic transmission of claim 6, wherein the park lock further comprises a retention spring coupled to the pawl at the proximal end portion of the pawl, the retention spring urging the pawl towards the park wheel.

8. The automatic transmission of claim 1, further comprising a transmission housing, the plurality of planetary gear sets disposed within the transmission housing, the primary and secondary rods extending through the transmission housing such that the primary rod is manually movable along the first axis without the primary actuator and the secondary rod is manually movable along the second axis without the secondary actuator.

9. The automatic transmission of claim 1, wherein the park wheel is separate from the output shaft.

10. The automatic transmission of claim 1, wherein the park wheel is integrally formed with the output shaft.

11. A park lock for an automatic transmission, the park lock selectively adjustable between a park configuration and a drive configuration, the park lock comprising:
   a park wheel defining a plurality of teeth;
   a pawl defining a tooth, the tooth of the pawl meshing with one or more of the plurality of teeth of the park wheel when the park lock is in the park configuration, the tooth of the pawl not meshing with the one or more of the plurality of teeth of the park wheel when the park lock is in the drive configuration;
   a primary rod coupled to the pawl;
   a primary actuator positioned at the primary rod, the primary actuator operable to move the primary rod along a first axis such that the primary rod rotates the pawl and selectively meshes the tooth of the pawl with the one or more of the plurality of teeth of the park wheel;
   a secondary rod positioned proximate the pawl;
   a secondary actuator positioned at the secondary rod, the secondary actuator operable to move the secondary rod along a second axis that is not parallel to the first axis,
   wherein a distal end portion of the secondary rod is positioned adjacent a first portion of the pawl when the park lock is in the park configuration to hold the tooth of the pawl in meshing with the one or more of the plurality of teeth of the park wheel, the distal end portion of the secondary rod positioned adjacent a second portion of the pawl when the park lock is in the drive configuration to block the tooth of the pawl from meshing with the one or more of the plurality of teeth of the park wheel.

12. The park lock of claim 11, wherein the primary and secondary actuators are electric solenoids.

13. The park lock of claim 12, further comprising a primary spring on the primary rod, the primary spring compressed between the primary actuator and a distal end portion of the primary rod.

14. The park lock of claim 13, further comprising a secondary spring on the secondary rod, the secondary spring compressed between the secondary actuator and the distal end portion of the secondary rod.

15. The park lock of claim 11, further comprising a support shaft on which that pawl is rotatable, the pawl extending between a proximal end portion of the pawl and a distal end portion of the pawl, the distal end portion of the secondary rod selectively engaging the pawl at the distal end portion of the pawl.

16. The park lock of claim 15, wherein the primary rod is coupled to the pawl between the proximal end portion of the pawl and the distal end portion of the pawl.

17. The park lock of claim 16, further comprising a retention spring coupled to the pawl at the proximal end portion of the pawl, the retention spring urging the pawl towards the park wheel.

18. The park lock of claim 11, wherein the primary rod extends through the primary actuator such that the primary rod is manually movable along the first axis without the primary actuator, the secondary rod extending through the secondary actuator such that the secondary rod is manually movable along the second axis without the secondary actuator.

19. The park lock of claim 11, wherein an angle defined between the first axis and the second axis is about ninety degrees.

20. A park lock for an automatic transmission, the park lock selectively adjustable between a park configuration and a drive configuration, the park lock comprising:
   a park wheel defining a plurality of teeth;
   a pawl defining a tooth, the tooth of the pawl meshing with the one or more of the plurality of teeth of the park wheel when the park lock is in the park configuration, the tooth of the pawl not meshing with the one or more of the plurality of teeth of the park wheel when the park lock is in the drive configuration;
   a primary rod coupled to the pawl;
   means for moving the primary rod such that the primary rod rotates the pawl and selectively meshes the tooth of the pawl with the one or more of the plurality of teeth of the park wheel;
   a secondary rod positioned proximate the pawl; and
   means for moving the secondary rod such that: (1) the secondary rod holds the tooth of the pawl in meshing with the one or more of the plurality of teeth of the park wheel when the park lock is in the park configuration; and (2) the secondary rod blocks the tooth of the pawl from meshing with the one or more of the plurality of teeth of the park wheel when the park lock is in the drive configuration.

\* \* \* \* \*